Nov. 11, 1924.                        1,515,290
A. WALLACE
TRUCK STRUCTURE
Filed Feb. 5, 1924          2 Sheets-Sheet 1
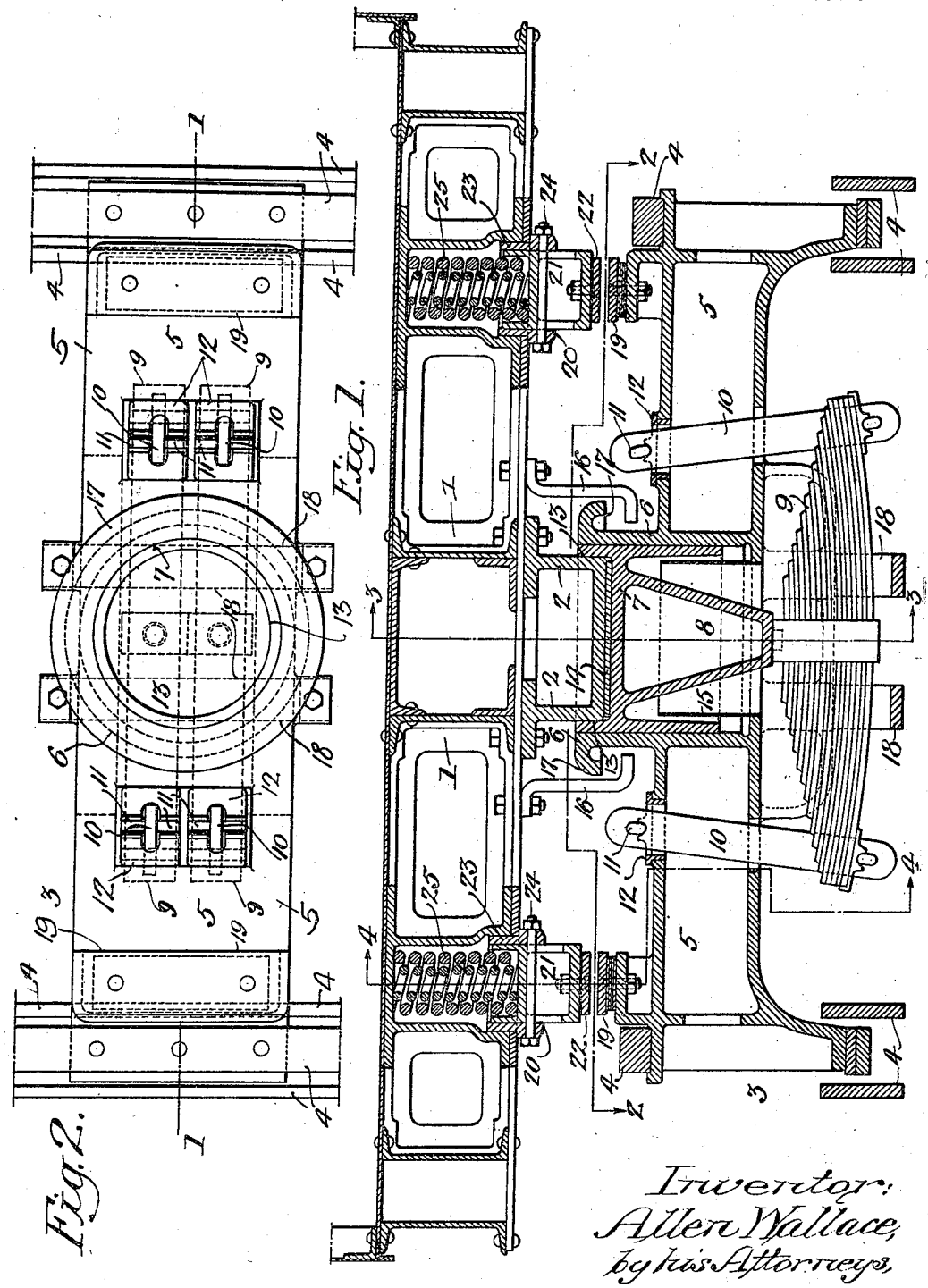
Inventor:
Allen Wallace,
by his Attorneys,
Howson Howson Nov. 11, 1924.

A. WALLACE

TRUCK STRUCTURE

Filed Feb. 5, 1924

Inventor
Allen Wallace,
by his Attorneys
Howson & Howson

Patented Nov. 11, 1924.

1,515,290

UNITED STATES PATENT OFFICE.

ALLEN WALLACE, OF MOORESTOWN, NEW JERSEY, ASSIGNOR TO THE BALDWIN LOCOMOTIVE WORKS, OF PHILADELPHIA, PENNSYLVANIA, A CORPORATION OF PENNSYLVANIA.

TRUCK STRUCTURE.

Application filed February 5, 1924. Serial No. 690,835.

*To all whom it may concern:*

Be it known that I, ALLEN WALLACE, a citizen of the United States, residing in Moorestown, Burlington County, New Jersey, have invented certain Improvements in Truck Structures, of which the following is a specification.

My invention relates to certain improvements in the center bearing construction of locomotives and other rolling stock, and particularly the connection between the body and the truck of an electric locomotive.

The object of my invention is to support the center pin by a center bearing, which is mounted on springs that are suspended upon, or otherwise carried by, the truck frame.

In the accompanying drawings:

Fig. 1 is a transverse sectional view on the line 1—1, Fig. 2, through the cab underframing and truck of an electric locomotive embodying my invention;

Fig. 2 is a plan view on the line 2—2, Fig. 1, showing a portion of the truck and the bearing for the center pin;

Figure 3:
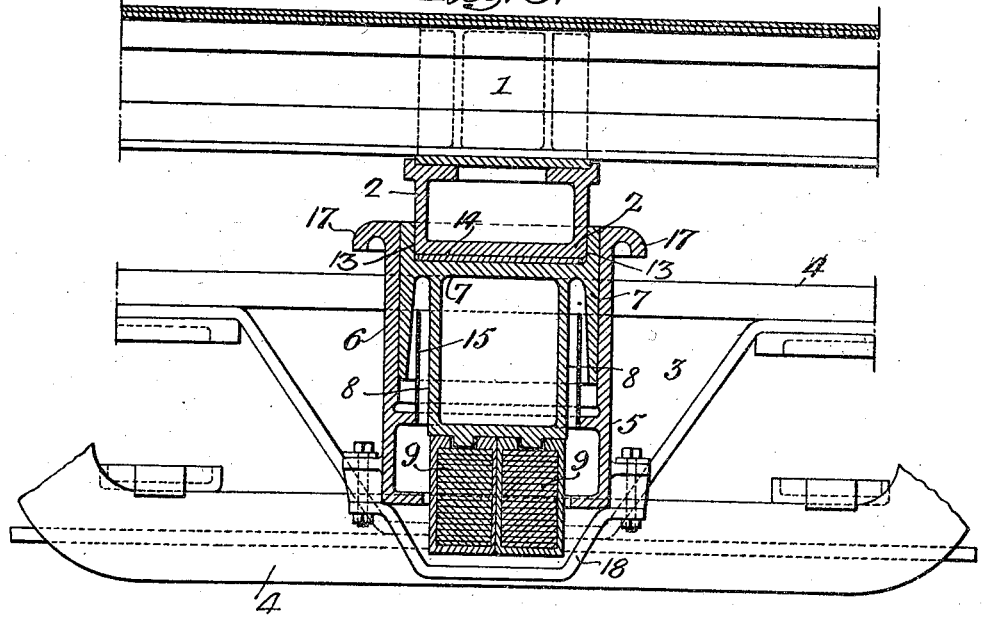
Fig. 3 is a sectional view on the line 3—3, Fig. 1.

Referring to the drawings, 1 is the underframing of the body structure of an electric locomotive, which takes the place of the ordinary body bolster. Secured at a central point on the underframing is a center pin 2. 3 is a truck that has frames 4 and a bolster 5. At the center of the bolster is a cylindrical guide 6, in which is mounted a center bearing 7, which has a central, depending portion 8 that rests upon the central portion of two half elliptical springs 9. These springs are carried by hangers 10, which are hung from rockers 11 that are supported by bearings 12, which are mounted on the bolster 5.

In the upper end of the center bearing 7 is a recess 13, in which is mounted the center pin 2. Between the bottom of the recess 13 and the lower end of the pin is a wear plate 14 of any suitable material. It will be noticed that the center bearing has an annular recess in its under side. Secured to the bolster is a cylindrical casing 15, which prevents the escape of lubricant from the cylindrical chamber 6, and insures the proper lubrication of the center bearing 7.

Secured to the under side of the underframing are safety lugs 16, which extend under a flange 17 on the bolster. 18 designates safety straps, which are attached to the frame of the truck and extend under the springs 9.

Figure 4:
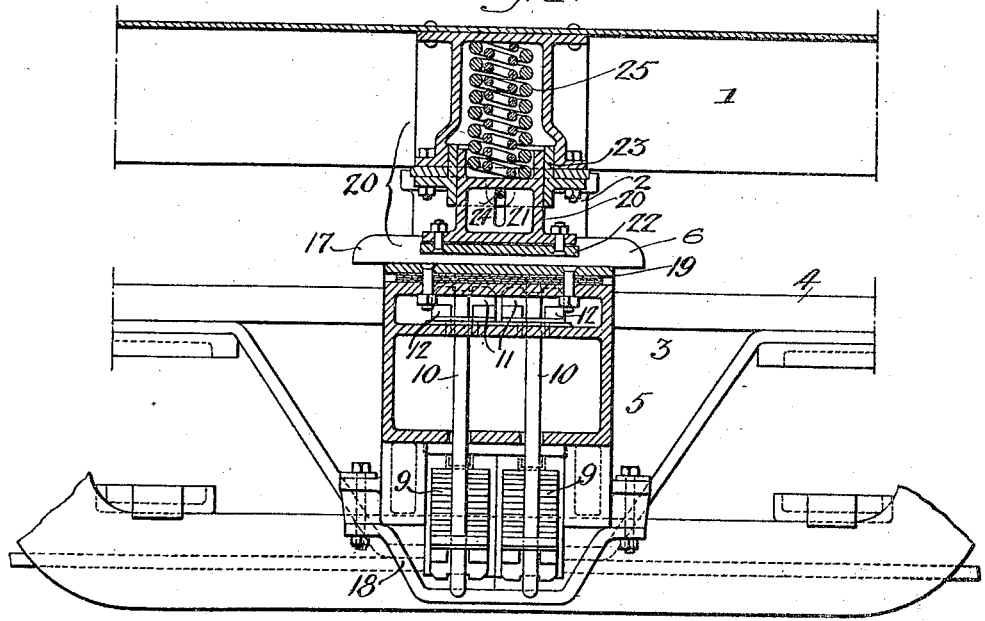
Fig. 4 is a sectional view on the line 4—4, Fig. 1.

19, 19 designate truck side bearing plates, which are secured to the bolster 5. Carried by the cab underframing are body side bearings 20, each consisting of a plunger 21 that carries a plate 22. This plunger is adapted to a bearing 23. Extending through a slot in the plunger is a stop bolt 24. Back of the plunger are two coiled springs 25, one within the other, as shown in Figs. 1 and 4, which hold the plunger yieldingly in the projected position.

The above construction of a spring-supporting bearing for the center pin of the body, or cab, takes the place of the usual spring construction at the side of the truck that, ordinarily, extends over the journal boxes. This arrangement insures a flexible vertical movement and the chafing surfaces are so arranged that they can be kept well lubricated.

The construction also allows the center pin weight to be located at one point of the truck, i. e., at the center. This gives an equal weight distribution of wheel weights on the rails and allows the truck to turn freely.

I claim:

1. The combination of a body structure; a center pin projecting therefrom; a truck bolster having a central guide; a center bearing mounted in the guide of the bolster; and a spring, supporting the center bearing, hung to the bolster, said center pin of the body structure resting upon the center bearing.

2. The combination of a body structure; a center pin projecting therefrom; a truck bolster having a center guide, open from top to bottom; a center bearing located in the open guide and recessed at the upper end to receive the center pin of the body structure; a spring under the truck bolster on which the center bearing rests; and hangers supporting the spring from the truck bolster.

3. The combination of a body structure having a center pin; a truck bolster having a cylindrical guide open at the top and at the bottom; a cylindrical center bearing located in the guide and recessed at the upper end to receive the center pin of the body portion, the center bearing extending through the guide; and a half elliptical spring suspended from the bolster upon which the lower end of the center bearing rests.

4. The combination of a cab underframing of an electric locomotive; a center pin secured thereto; a truck having side frames and a bolster, said bolster having a cylindrical guide; a center bearing located in the guide and having a recess for the center pin, said center bearing having a depending portion; two semi-elliptical springs supporting the bearings; hangers pivotally mounted on the bolster and supporting the springs; and a casing located within the guide and forming an annular receptacle for a lubricant.

ALLEN WALLACE.